United States Patent [19]

Milnes et al.

[11] Patent Number: 5,276,885

[45] Date of Patent: Jan. 4, 1994

[54] SINGLE STEP MAPPING IN TOPOLOGICAL ORDER OF THE QUEUED CLASS AND INSTANCE FRAMES OF A SEMANTIC NETWORK TO A STATIC WORKING MEMORY

[75] Inventors: Brian G. Milnes; David G. Scarola, both of Pittsburgh, Pa.

[73] Assignee: Carnegie Group, Pittsburgh, Pa.

[21] Appl. No.: 687,125

[22] Filed: Apr. 18, 1991

[51] Int. Cl.⁵ ............................................. G06F 15/40
[52] U.S. Cl. ................................... 395/700; 395/600; 395/500; 364/DIG. 1; 364/282.1
[58] Field of Search .................. 395/63, 62, 575, 600, 395/700, 500; 364/513, 578

[56] References Cited

U.S. PATENT DOCUMENTS

| | | | |
|---|---|---|---|
| 4,558,413 | 12/1985 | Schmidt et al. | 364/300 |
| 4,675,829 | 6/1987 | Clemenson | 364/513 |
| 4,821,220 | 4/1989 | Duisberg | 364/578 |
| 4,868,733 | 9/1989 | Fujisawa et al. | 364/200 |
| 4,937,760 | 6/1990 | Beitel et al. | 364/513 |
| 4,964,063 | 10/1990 | Esch | 364/513 |
| 5,115,504 | 5/1992 | Belove et al. | 395/600 |
| 5,136,705 | 8/1992 | Stubbs et al. | 395/575 |

OTHER PUBLICATIONS

D. E. Knuth "The Art of Computer Programming, vol. 1, Fundamental Algorithms" 1973, Addison-Wesley, Reading, U.S. Paragraph 2.2.3, Linked Allocation. p. 259, 1.21–262-42.

Microprocessing and Microprogramming. vol. 28, No. 1/5, Mar. 1990, Amsterdam NL pp. pp. 197-200; H. Bretthauer et al.; "Multiple vs. Single Inheritance in Object-oriented Programming Languages"; see p. 198, left column.

25th ACM/IEEE Design Automation Conference Jun. 12, 1988, IEEE Comp. Soc. Press, Washington, US, pp. 275-281; Hong-Tai Chou et al: 'Versions and Change Notification in an Object-Oriented Database System', see abstract; see p. 279, left column, 1. 49–p. 280, right column, 1. 38; FIG. 2.

Research Disclosure No. 303, Jul. 1989, Havant GB p. 526; "Cluster Objects for Mass Editing", RD No. 30364.

"Reducing Computation by Unifying Inference with User Interface" by Mark W. Perlin, Jun. 1988 CMU-C-S-88-150.

Primary Examiner—Thomas C. Lee
Assistant Examiner—Wayne Amsbury
Attorney, Agent, or Firm—Brooks & Kushman

[57] ABSTRACT

Method and apparatus are provided for mapping information from a dynamic frame-based semantic network to a static working memory by utilizing a topological sorting algorithm which processes at least one queue of frames. Preferably, the algorithm is utilized with filtering to avoid unnecessary updates. The algorithm makes a marking pass and an updating pass across the queued frames. The marking pass orders a queue of class frames. The updating pass updates working memory elements of the working memory corresponding to the ordered class frames and working memory elements which correspond to instances of the class. After the updating pass, the working memory elements reflect local and inheritable slots and values from the semantic network. Such mapping allows the working memory elements to be further processed such as by matching against rules.

12 Claims, 3 Drawing Sheets

SINGLE STEP MAPPING IN TOPOLOGICAL ORDER OF THE QUEUED CLASS AND INSTANCE FRAMES OF A SEMANTIC NETWORK TO A STATIC WORKING MEMORY

TECHNICAL FIELD

This invention relates to method and apparatus for mapping information from a dynamic frame-based semantic network to a static working memory, for example, in the field of artificial intelligence.

BACKGROUND ART

Artificial intelligence (AI) technology is a discipline with an ultimate goal of providing a machine that is capable of reasoning, making inferences and following rules in a manner believed to model the human mind. Artificial intelligence provides relatively untrained users sophisticated computer power to solve practical problems such as to assist in the analysis of massive amounts of relatively unprocessed data to aid in decision-making processes.

In the field of artificial intelligence, "knowledge" is a combination of data structures and interpretive procedures which, if suitably manipulated, will lead to what might best be termed "knowledgeable" behavior. A knowledge base is a set of knowledge representations which describes a domain of knowledge. A knowledge base is to an artificial intelligence environment what a database is to a conventional computer program. Unlike a database, however, a knowledge base can include executable program material within a defined record herein called a slot. One type or category of representing knowledge is descriptive knowledge. This category is the collection and classification of facts and categorizations about an idea or entity which might be acted upon. The basic units of descriptive knowledge are generally called frames. A frame contains one or more slots.

As used herein, slots embody the attribute, relationship, and procedural information of the object or concept which is being represented. A collection of slots is a frame which is an atomic unit of knowledge. Two types of frames are provided herein: class and instance. A class frame is used to represent a generalized type or category of object. An instance is used to represent a particular member of a class.

Three types of slots are provided herein: attribute, relation, and message. Attribute slots are used to store values (e.g. integer numbers, character strings, etc.). Relation slots are used to store user-defined links between frames in the knowledge base. Message slots are used to store procedural code (i.e. functions) which is executed in response to messages sent to the frame by an application program.

One of the key concepts of artificial intelligence is that of inheritance. It is a development of the idea of using a hierarchical structure for relating frames in a knowledge base. The key to these structures is the concept of connecting relations between structures of data or knowledge through which information about slots may pass to other structures of data or knowledge.

There is a need for an efficient and accurate way to merge a frame-based system such as ROCK with a rule-based system such as TIN so that inheritance of slots and values can occur at runtime rather than at compile time. Knowledge Craft provides an ad hoc approach to inheritance for rule matching which is not particularly efficient or accurate.

SUMMARY OF THE INVENTION

An object of the present invention is to provide an efficient and accurate method and apparatus for mapping information from a dynamic frame-based semantic network to a static working memory utilizing a topological sorting algorithm.

In carrying out the above object and other objects of the present invention, a method is provided for mapping information from a dynamic frame-based semantic network to a static working memory having a plurality of working memory elements. The method includes the steps of creating one class queue and one instance queue of frames to obtain queued frames having the information to be mapped, marking each of the queued frames of the class queue to order the queued frames of the class queue and updating working memory elements of the working memory corresponding to the queued frames with the information to be mapped based on the order of the queued frames of the class queue to obtain an updated working memory.

Further in carrying out the above object and other objects of the present invention in a data processing system including processing means and memory means including a static working memory having a plurality of working memory elements operatively coupled to the processing means, an apparatus for mapping information from a dynamic frame-based semantic network to the static working memory is provided. The apparatus includes means for creating one class queue and one instance queue of frames to obtain queued frames having the information to be mapped and means for marking each of the queued frames of the class queue to order the queued frames of the class queue. The apparatus also includes means for updating the working memory elements of the working memory corresponding to the queued frames with information to be mapped based on the order of the queued frames of the class queue to obtain an updated working memory.

Preferably, at least one of the class frames has multiple queued parent class frames having a first part of the information and at least one instance frame. The multiple queued parent class frames are marked during the marking. Working memory elements corresponding to the class frames and instance frames are updated with the first part of the information during the updating.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Introduction

The method and apparatus of the present invention merges the frame-based technology of a frame system such as ROCK with the rule-based technology provided by a rule language such as TIN. The frame-based system always supports dynamic runtime inheritance of slots and values across system-relations subclassOf and instanceOf from classes to descendant classes and instances. The rule language does not support inheritance of slots and values at runtime.

SubclassOf links a class to its parent classes (of which there are one or more). InstanceOf links an instance to its (single) parent class. In the frame system, values may be inherited across either of these links at runtime.

In the method and apparatus of the present invention, every frame which matches against rules is given a working memory element (wme) internally. In general, rule languages are designed to match rules against wmes—data structures which are much simpler and more static than frames. The wmes are created in the present invention so that they contain the slots and values from the frame that are matched in the rules. "Matching rules against a frame" is implemented by matching rules against the wme for the frame.

As a program executes and rules are fired and values in frames change, a problem arises: since runtime inheritance of slots and values is not supported in rule language wmes, a mechanism must be implemented which updates the wmes so that they accurately reflect the same data that is in the corresponding frames. The way in which inheritance of slots and values across subclassOf and instanceOf is propagated to wmes (thereby storing the proper updated data in the wmes) is disclosed herein.

Another way of stating the problem is that much of the data in frames does not exist locally; rather it is inherited from other frames at runtime. Wmes are very different since all of a wme's information exists locally in the wme, and no information is inherited at runtime. When a value is changed in a frame, the wme corresponding to the frame must be updated as well as all the wmes which correspond to frames which can inherit the value.

Example: a set of class and instance frames with slots and values.

A relatively small frame system application has the following frames and slots:

Class Frames: Class1 Class2 Class3 Class4

Instance Frames: Instance1 Instance2 Instance3 Instance4

Attribute Slots: Slot1 Slot2 Slot3

Figure 1:
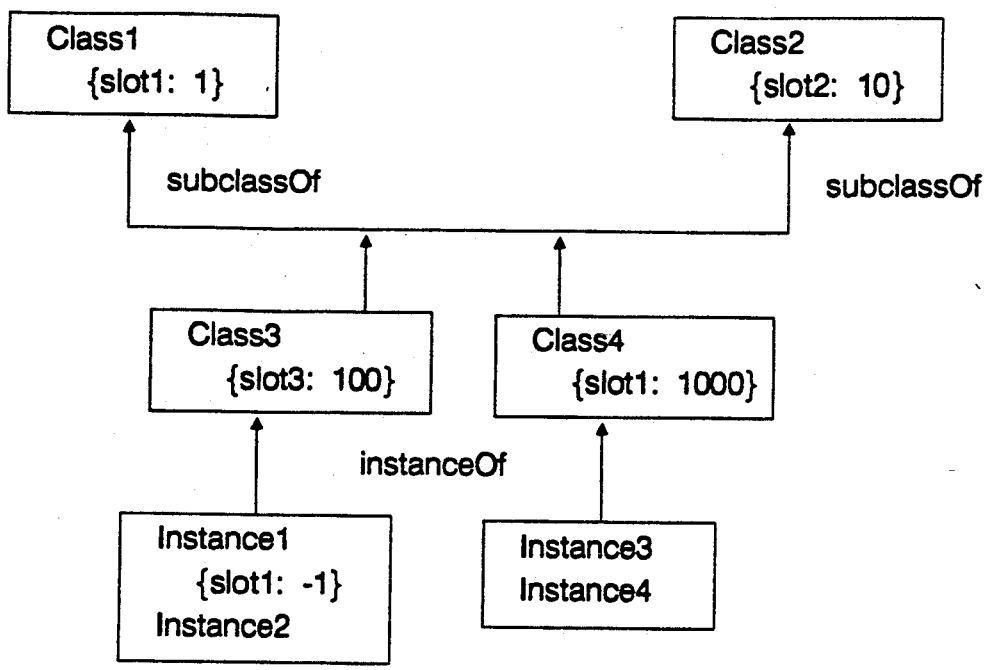
FIG. 1 is a schematic block diagram view of frames which have values and which are organized into a frame hierarchy.

In this application, the frames are organized into a frame hierarchy of FIG. 1 (the slots and values that each frame contains are in curly brackets).

Class3 and Class4 are subclasses of both Class1 and Class2.
Instance1 and Instance2 are instances of Class3.
Instance3 and Instance4 are instances of Class4.

Inheritance of Slots

Instance1 and Instance2 inherit the following slots:
Slot1 from Class1
Slot2 from Class2
Slot3 from Class3

Instance3 and Instance4 inherit the following slots:
Slot1 from Class1 and Class4
Slot2 from Class2

Runtime Inheritance

In the frame system, inheritance occurs at runtime. When the frame system function kb_GetValue is called to access the value for a slot in a frame, if the frame contains the local value for a slot, the local value is returned. For example, when the frame system function kb_GetValue is called to access the value of Slot1 contained in Instance1, −1 is returned. However, when a frame does not contain a local value for a slot, inheritance is used to access the value for that slot from an ancestor of that frame. If kb_GetValue is used to access the value of Slot3 in Instance1, since Instance1 does not contain a local value for Slot3, the value 100 is inherited from Class3 across system-relation instanceOf and returned from kb_GetValue.

Rule Example

The method and apparatus of the present invention allows rules to be matched against frames. Rule conditions can be created which contain tests against frame classes and slot values. For example, the following rule contains a single rule condition:

```
rule R1
{
    IF
    Class1
    {
        Slot1 < 0;
        Slot2 > 0;
    }
    THEN
    —
    {
```

The rule contains tests for Class1, Slot1, and Slot2. Class frame Class1 and all descendant class and instance frames of Class1 are matched against this condition. The semantics of the invention are specified such that only the frames that pass the following tests successfully match the condition:

The frame is either Class1, a descendant class of Class1, or an instance of Class1.
AND
The value for Slot1 in a frame is less-than 0 (i.e., Slot1<0)
AND
The value for Slot2 in a frame is greater-than 0 (i.e., Slot>0)

The value for a slot in a frame which is used in rule tests can either be local or inheritable. Inheritance values are inherited across the system-defined relations (subclassOf and instanceOf).

Working-Memory Elements (wmes)

Each frame which matches rules has an associated rule language working-memory element (wme). Both class and instance frames match rules. Therefore, both class and instance frames have associated wmes. The wme for a frame is a vector which contains slots and values. The slots in a wme associated with a particular frame are all the slots which are both local to the frame or inheritable across either subclassOf or instanceOf to that frame.

For example, Instance1 contains Slot1 locally, and Slot2 and Slot3 by inheritance (Slot2 is inherited from Class2 and Slot3 is inherited from Class3). The wme for Instance1 contains slots Slot1, Slot2 and Slot3.

The wme values are the local or inheritable values for each slot in the frame. For example, Instance1 contains −1 for Slot1 locally, and Instance1 inherits 10 for Slot2 from Class2 and 100 for Slot3 from Class3. Therefore, the wme for Instance1, contains values −1 for Slot1, 10 for Slot2, and 100 for Slot3. That is, the wme for Instance1 is:

```
wme1
{       Slot1:      −1;
        Slot2:      10;
        Slot3:      100;
}
```

Matching Frames Against Rules

Matching a frame against a rule is implemented by matching the wme associated with the frame against a rule. Since a wme is a mirror copy of a frame, and the wme contains the same local and inheritable slots and values as the frame, matching the wme against a rule gives the same result as matching the frame against a rule. WMEs are matched against rules instead of matching frames directly because wme vectors can be matched much faster than frames.

For example, matching Instance1 against rule R1 is implemented by matching wme1 against rule R1
1) wme1 corresponds to an instance frame of Class1
2) wme1 contains −1 for Slot1, which is less than 0
3) wme1 contains 10 for Slot2, which is greater than 0

WME1 passes the tests in the condition for R1 and so it matches R1. Therefore, Instance1 matches R1.

Matching System-Inherited Values

As previously mentioned, rule language wmes do not support runtime inheritance. That is, values can only be set and accessed locally in a wme. Values in a wme are never inherited during runtime to other wmes. However, values can be inherited during runtime among frames. Since a wme mirrors a frame, and the wme contains both local and inheritable values for a frame, the inheritable values must somehow be propagated down to the wme (that is, the wme is essentially a cache of the frame values). The way in which values that are inheritable to a frame across relations instanceOf and subclassOf are propagated to the wme for rule matching is described hereinbelow.

Overview Of Propagating Inheritable Frames Values to WMEs

When a frame is modified herein, the frame is placed on a queue. Queue processing involves ordering the frames on the queue. After the queue is ordered, the frames on the queue are traversed in that order, and values are updated in each frame's associated wme. In the example given above, Instance1 contains value −1 in Slot1. If a frame system function is invoked which modifies the value of Slot1 in Instance1, then Instance1 is placed on the queue. When the queue is processed, the value for Slot1 in the wme that mirrors Instance1 is set to the new value.

Maintaining the correspondence between frame values and wme values is more difficult when inheritable values are modified. When a class that contains a slot which is inheritable to descendant classes and instances is updated to contain a new value for the slot, the class is placed on the queue. When the queue is processed, the wme for the class and the wmes for any descendant classes and instances that can inherit the updated value for the slot are updated. For example, if the value of Slot3 in Class3 is updated, Class3 is placed on the queue. When the queue is processed, the wmes for Class3, Instance1, and Instance2 must all be updated to contain the new value for Slot3.

The queue is processed using an implementation of a topological sorting algorithm with filtering. The topological sorting algorithm applies an ordering to classes on the queue. This ordering is followed when the wmes corresponding to the class frames are updated. An ordering is required because a particular frame may inherit values from multiple updated classes; if there is no ordering, inefficiency (and possibly even incorrectness) will result because the frame's wme will be updated multiple times, once for each inheritable modification.

Class frames only are ordered because an ordering only needs to be applied to the frames from which values are inheritable across system-defined relations. An instance frame is updated in the same order as its class. Since values are not inheritable across system-relations from instances, the instances do not need to be ordered. Therefore, two frame queues are maintained, namely a class queue and an instance queue. The instance queue is maintained to have a place to store local changes which are made to the instances.

Filtering is used to block the propagation of frame value changes which do not need to be propagated to wmes. If the value for a slot is updated in a class, the wme for any descendant frame of the class that has a local value for the slot does not need to be updated with the value (the local value overrides the inheritable value). Therefore, filtering is applied to block the propagation of the updated value.

Implementation Of Propagating Inheritable Frame Values to WMEs

An example involving updates to the frames of the hierarchy of FIG. 1 is described hereinbelow. The following calls to kb_SetValue are made (the frame system function kb_SetValue is used to update a slot value in a frame):

| kb_SetValue( | Class2,    | Slot2, −10   | ); |
| kb_SetValue( | Instance1, | Slot1, −5    | ); |
| kb_SetValue( | Instance4, | Slot2, −7    | ); |
| kb_SetValue( | Class4,    | Slot1, −1000 | ); |
| kb_SetValue( | Class1,    | Slot1, −1    | ); |
| kb_SetValue( | Instance4, | Slot1, −7    | ); |

The frame queues, which contain updated frames and slots whose values were updated, are as follows after these value updates:

| Class queue:    | [Class2, Slot2]           |
|                 | [Class4, Slot1]           |
|                 | [Class1, Slot1]           |
| Instance queue: | [Instance1, Slot1]        |
|                 | [Instance4, Slot2, Slot1] |

Figure 2:
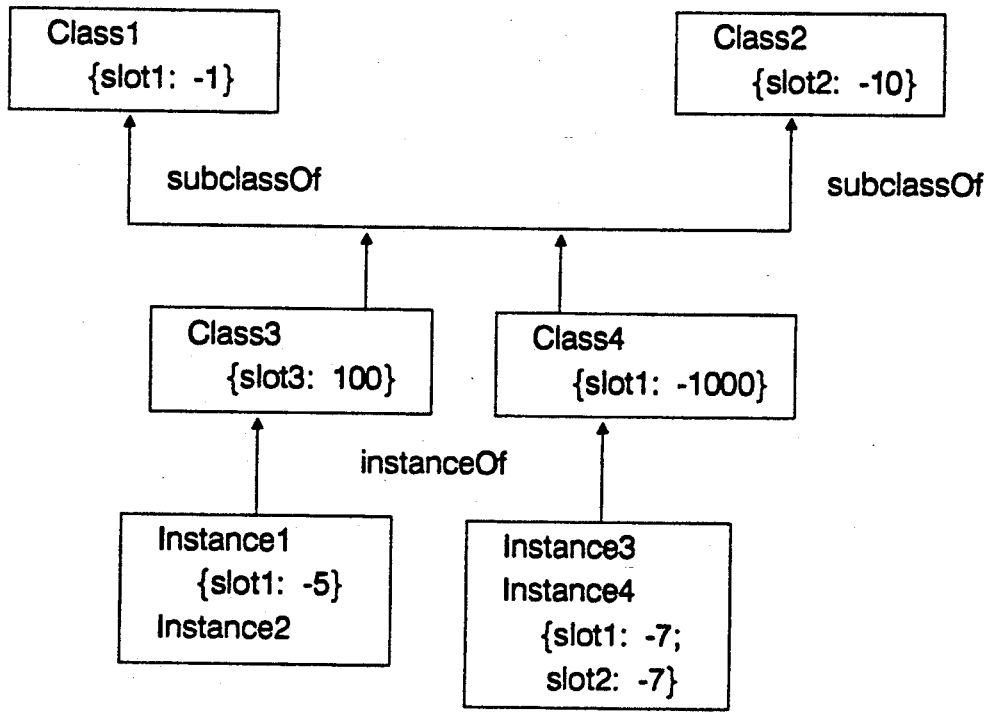
FIG. 2 is a schematic block diagram view of the frame hierarchy of FIG. 1 but whose values are modified.

The resulting frame hierarchy is illustrated in FIG. 2.

Even though the values in these frames of FIG. 2 have been updated, these frames are still on the frame queue. The updated values are reflected in the frames but not in the wmes. The wmes are updated to reflect these frame changes when the queue is processed. The queue is processed and wmes are updated just before rules are matched. Queue processing involves making two passes across frames on the queue:

(1) A marking pass which orders the classes; and
(2) An update pass which updates the wmes for the ordered frames.

1. The Marking Pass

Figure 3:
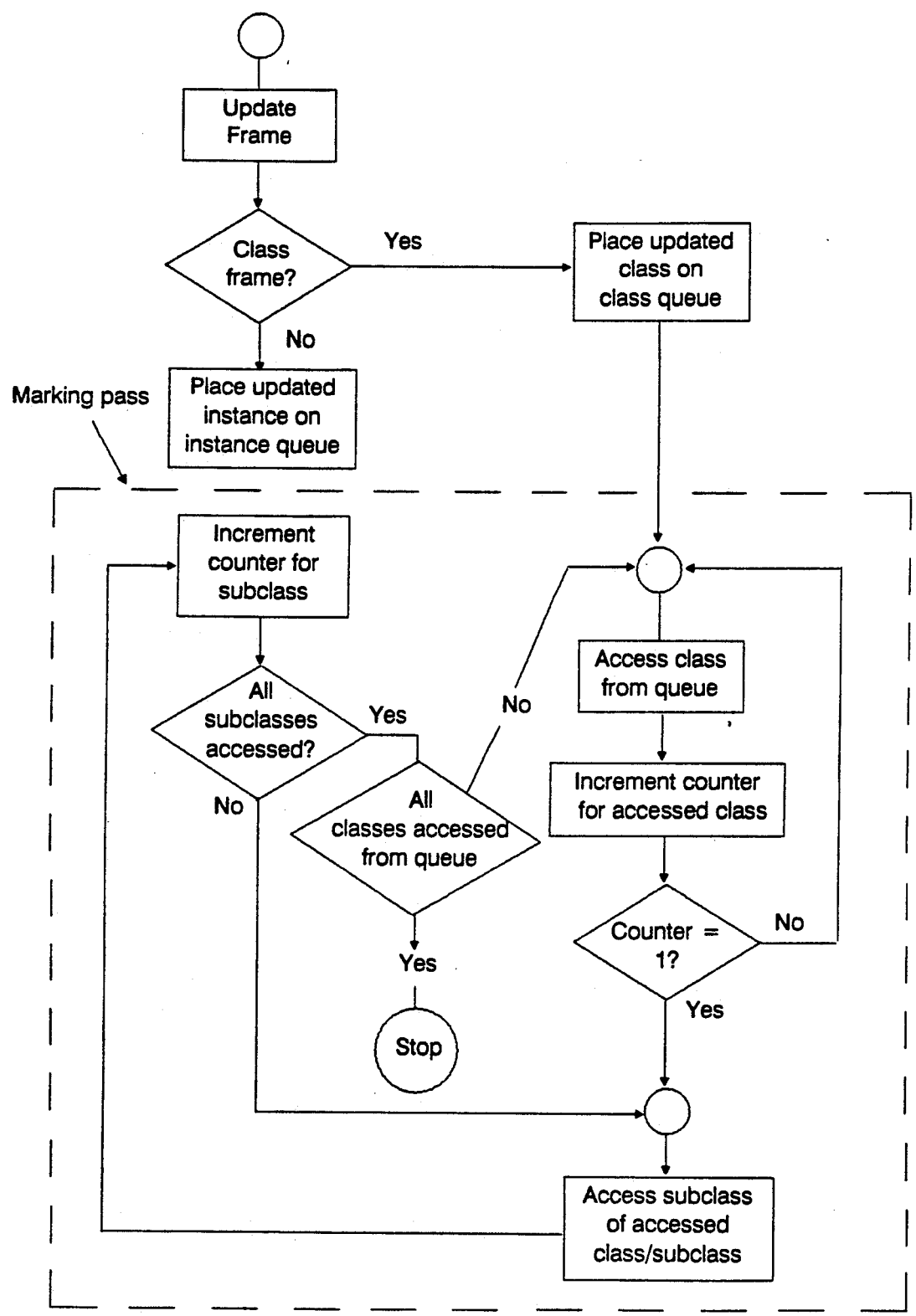
FIG. 3 is a block diagram flow chart illustrating a first part of topological sorting algorithm of the method and apparatus of the present invention.

As illustrated in FIG. 3, the marking pass traverses the frames on the class queue to apply an order to the classes. A counter is kept for each class. The counter is used to maintain the order in which the wmes for the classes on the queue (and their subclasses and instances) are updated. WMEs are updated during the update pass (described below). The order required for wme updates ensures that a frame is updated after every class which contains an updated value that is inheritable to that frame has been updated. Therefore, the counter for a class represents the number of such classes that must be updated before the class itself is updated.

As shown in FIG. 3, the marking pass iterates down the classes on the class queue, and for each class executes the following steps:

1. Increment the counter for that class; and
2. If the counter equals 1: for each subclass of that class, repeat step 1.

In step 2, the subclassOf link of a class is accessed to gather the subclasses of the class. Instances are not accessed during the marking pass because an instance is updated in the same order as its class.

Executing the marking pass on the example class queue would create the following counter changes:
Access Class2 from the queue:
  1. Increment counter [result: Class2.count = 1]
  2. Class2.count = 1
  Access subclass Class3:
    1. Increment counter [result: Class3.count = 1]
    2. Class3.count = 1 since Class 3 has no subclasses, return.
  Access subclass Class4:
    1. Increment counter [result: Class4.count = 1]
    2. Class4.count = 1 since Class4 has no subclasses, return.
Access Class4 from the queue:
  1. Increment counter [result: Class4.count = 2]
  2. Class4.count = 2 so return.
Access Class1 from the queue:
  1. Increment counter [result: Class1.count = 1]
  2. Class1.count = 1
  Access subclass Class3:
    1. Increment counter [result: Class3.count = 2]
    2. Class3.count = 2 so return.
  Access subclass Class4:
    1. Increment counter [result: Class4.count = 3]
    2. Class4.count = 3 so return.
Final result:
  Class1.count = 1
  Class2.count = 1
  Class3.count = 2
  Class4.count = 3

The Update Pass

Figure 4:
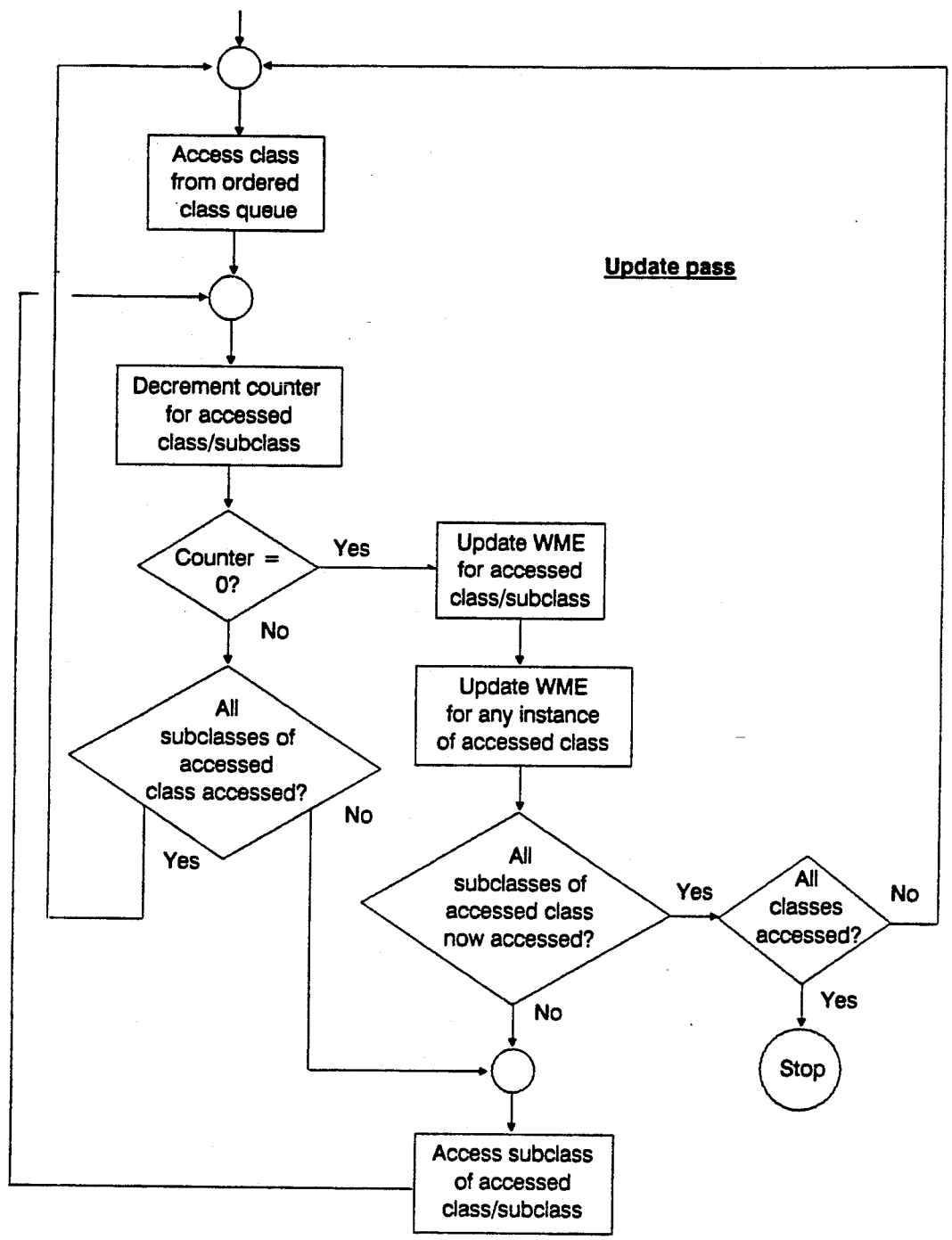
FIG. 4 is a block diagram flow chart illustrating the second part of the algorithm.

As illustrated in FIG. 4, the updated pass traverses the classes that were ordered during the marking phase and propagates all value updates to the wmes in the specified order. The order is based on the counters associated with each class. The counter indicates that a class' wme (and the wmes for the class' instances) should only be updated after the counter reaches 0. When a frame's counter reaches zero, it means that wmes for all frames on which that frame depends for slot and value inheritance have been updated; the wme for the frame is then updated. The updated wme reflects all modified local values of a frame and all modified values which were inherited across subclassOf and instanceOf to that frame.

As shown in FIG. 4, the basic update process "pops" a class off of the class queue and executes the following steps on that class:

1. Decrement the counter for that class.
2. If the counter = 0:
  a. call UPDATE_WME for that class;
  b. call UPDATE_WME for each instance of that class;
  c. for each subclass of that class, go to step 1.

In step 2b immediately above, the instances are gathered by accessing the instanceOf link in the class. In step 2c, the subclasses are gathered by accessing the subclassOf link in the class.

Executing the update pass on the example queue above creates the following updates:

Access Class2 from the queue:
  1. decrement counter [result: Class2.count = 0]
  2. Class2.count - 0:
    a. UPDATE_WME (Class2)
       [result: Class2_wme.Slot2 = −10]
    b. Class2 has no instances
    c. Access subclass Class3:
      1. decrement counter [result: Class3.count = 1]
      2. Class3.count = 1 so return.
      Access subclass Class4:
      1. decrement counter [result: Class4.count = 2]
      2. Class4.count = 2 so return.
Access Class4 from the queue:
  1. decrement counter [result: Class4.count = 1]
  2. Class4.count = 1 so return.
Access Class1 from the queue:
  1. decrement counter [result: Class1.count = 0]
  2. Class1.count = 0:
    a. UPDATE_WME (Class1)
       [result: Class1_wme.Slot1 = −1]
    b. Class1 has no instances
    c. Access subclass Class3:
      1. decrement counter
         [result: Class3.count = 0]
      2. Class3.count = 0:
        a. UPDATE_WME( Class3 )
           [result: Class3_wme.Slot1 = −1]
           Class3_wme.Slot2 = −10]
        b. UPDATE_WME (Instance1)
           [result: Instance1_wme.Slot1 = −5
           Instance1_wme.Slot2 = −10]
           UPDATE_WME (Instance2)
           [result: Instance2_wme.Slot1 = −1
           Instance2_wme.Slot2 = −10]
        c. Class3 has no subclasses
      Access subclass Class4
      1. decrement counter
         [result: Class4.count = 0]
      2. Class4.count = 0:
        a. UPDATE_WME (Class4)

-continued

```
        [result:    Class4_wme.Slot1 =  −1000
                    Class4_wme.Slot2 =  −10]
    b.  UPDATE_WME (Instance3)
        [result:    Instance3_wme.Slot1 =
                    −1000
                    Instance3_wme.Slot2 =
                    −10]
        UPDATE_WME (Instance4)
        [result:    Instance4_wme.Slot1 =
                    −7
                    Instance4_wme.Slot2 =
                    −7]
    c.  Class4 has no subclasses
```

After the updated pass is completed, the wmes reflect the local and inheritable slots and values from the frame-base. The wmes are then matched against the rules, effectively matching both local and inheritable frame values.

While the bias algorithm is given above, a few preferred features that are described in the example are highlighted as follows:

(1) Some of the UPDATE_WME calls update multiple values in a wme. For example, the UPDATE_WME call for Instance1 updated Slot1 in the wme to contain value −5, which was set locally in Instance1, and updated Slot2 to contain value −10, which is the value inherited to Instance1 for Slot2 from Class 2. Multiple wme updates which reflect multiple frame updates are supported by building a list or data structure of slots and values to update during the update pass. This list is built incrementally as the subclasses of enqueued classes are traversed during the update pass (whenever a class from which a value is inherited is traversed during the update pass, the slot & value are added to the inheritable-slot-value-list). When UPDATE_WME is called, the frame whose wme must be updated and the inheritable-slot-value-list are passed in. The inheritable-slot-value-list is merged with the local value updates to that frame. The wme is updated by setting the local and inheritable values in the wme.

(2) Filters are applied to frames to avoid unnecessary updates. A filter recognizes that an inheritable slot should not be updated in the wme for a frame which has a local value for the slot. The local value is used instead of the inheritable value. In the call to UPDATE_WME for Instance1, one of the members of the inheritable-slot-and-value-list is [Slot1, −1] which is the inheritable value for Slot1 from the update to Class1. This must be filtered for Instance1 because Instance1 has a local value for Slot1.

(3) When a class may inherit a slot value from multiple ancestor classes, it may be difficult for the method and system to do the propagation properly, since a frame system inheritance algorithm (which permits both depth-first and breadth-first searches) would have to be inverted. When it is determined that the value for a slot can be inherited from multiple ancestor classes, the invention utilizes a frame system algorithm to inherit the slot and value from the appropriate class. The invention recognizes these cases in which the search strategy is a factor and calls the frame system function kb_GetValue to execute the multiple inheritance.

The method and apparatus of the present invention provides numerous advantages. For example, the application of topological sorting allows the runtime inheritance of slots and values across subclassOf and instanceOf, which is not part of working memory in a rule language, to be active when matching rules against frames. This application of topological sorting provides a correctness and performance improvement over the ad hoc approach to inheritance for matching implemented in the prior art.

The algorithm is correct because all frames on which a frame depends for inheritance are updated before that frame is updated. Therefore, when a frame is updated, it will get the correct inherited values.

The algorithm is efficient because each frame is updated only one time. The correctness and efficiency of topological sorting is described in the technical report "Reducing Computation by Unifying Inference with User Interface" by Mark Perlin.

This application of topological sorting is also unique because it utilizes the complexity of inheritance of a frame system, allows for inheritance of multiple slots and values, inheritance from multiple classes, and filter optimizations.

While the best mode for carrying out the invention has been described in detail, those familiar with the art to which this invention relates will recognize various alternative designs and embodiments for practicing the invention as defined by the following claims.

What is claimed is:

1. A method of operating a processing means to map updated information upon a call to access from a dynamic frame-based semantic network having class frames and instance frames, with each of said instance frames being associated with at least one of said class frames, to a static working memory having a plurality of working memory elements, each said working memory element corresponding to one of said class frames and instance frames, the method comprising the steps of:

(a) utilizing the processing means to create one class queue of the class frames and one instance queue of the instance frames in a memory means to obtain queued class frames and instance frames having the updated information to be mapped;

(b) utilizing the processing means to mark each of the queued class frames of the class queue to order the queued class frames of the class queue to reflect a currently proper sequence of updating the working memory elements; said step (b) further includes setting a counter corresponding to each of the queued class frames, each said counter having a value based on a topological sort of the queued class frames; and (c) utilizing the processing means to update the working memory elements of the working memory corresponding to the queued class frames and queued instance frames with the updated information to be mapped based on the order of the queued class frames of the class queue to obtain an updated working memory, said working memory elements corresponding to one of said queued class frames and said queued instance frames associated with said one of said queued class frames being updated in a single step.

2. The method as claimed in claim 1 wherein the queued class frames include a plurality of class frames and wherein at least one of the class frames is a subclass frame having at least two parent class frames having a first part of the information, the at least two parent class frames being marked during step (b), working memory elements corresponding to the at least one subclass frame and at least two parent class frames being updated with the first part of the information during step (c).

3. The method as claimed in claim 2 wherein the instance queue includes at least one instance frame having a second part of the information and wherein a working memory element corresponding to the at least one instance frame is updated with the second part of the information during step (c).

4. The method as claimed in claim 3 wherein the queued class frames including the at least one subclass frame and the at least one instance frame include local and inherited slots and values and wherein the corresponding working memory elements are updated with information based on the local and inherited slots and values.

5. The method as claimed in claim 4 further comprising the steps of:
creating a plurality of inherited slots and values during the step of updating;
linking the plurality of inherited slots and values to create a data structure;
retrieving one of a class frame and an instance frame which inherits multiple slots and values; and
utilizing the data structure during step (c) to allow a working memory element corresponding to the retrieved frame to be updated to reflect the information to be mapped;
wherein the retrieved frame is retrieved only a single time.

6. The method of claim 4 further comprising the step of filtering the class and instance frames so that a working memory element corresponding to a slot of a frame which has a local value will not be updated.

7. In a data processing system including processing means and memory means including a static working memory having a plurality of working memory elements operatively coupled to the processing means, apparatus for mapping updated information upon a call to access from a dynamic frame-based semantic network having class frames and instance frames, with each of said instance frames being associated with at least one of said class frames, to the static working memory having a plurality of working memory elements, each said working memory element corresponding to one of said class frames and instance frames, the apparatus comprising:
(a) means for creating one class queue of the class frames and one instance queue of the instance frames in the memory means to obtain queued class frames and instance frames having the updated information to be mapped;
(b) means for marking each of the queued class frames of the class queue to order the queued class frames of the class queue to reflect a currently proper sequence of updating the working memory elements; said means (b) further includes means for setting a counter corresponding to each of the queued class frames, each said counter having a value based on a topological sort of the queued class frames; and
(c) means for updating the working memory elements of the working memory corresponding to the queued class frames and queued instance frames with the updated information to be mapped based on the order of the queued class frames of the class queue to obtain an updated working memory, said working memory elements corresponding to one of said queued class frames and said queued instance frames associated with said one of said queued class frames being updated in a single step.

8. The apparatus as claimed in claim 7 wherein the queued class frames include a plurality of class frames and wherein at least one of the class frames is a subclass frame having at least two parent class frames having a first part of the information, the at least two parent class frames being marked, working class memory elements corresponding to the at least one subclass frame and at least two parent class frames being updated with the first part of the information.

9. The apparatus as claimed in claim 8 wherein the step of creating includes the step of creating a second queue including at least one instance frame having a second part of the information and wherein a working memory element corresponding to the at least one instance frame is updated with the second part of the information.

10. The apparatus as claimed in claim 9 wherein the queued class frames including the at least one subclass frame and the at least one instance frame include local and inherited slots and values and wherein the corresponding working memory elements are updated with information based on the local and inherited slots and values.

11. The apparatus as claimed in claim 10 further comprising:
means for creating a plurality of inherited slots and values;
means for retrieving one of a class frame and an instance frame which inherits multiple slots and values; and
means for linking the plurality of inherited slots and values to create a data structure wherein the means for updating utilizes the data structure to update a working memory element corresponding to a retrieved frame.

12. The apparatus as claimed in claim 10 further comprising filtering means for filtering the class and instance frames so that a working memory element corresponding to a frame which has a local value will not be updated.

* * * * *